United States Patent Office.

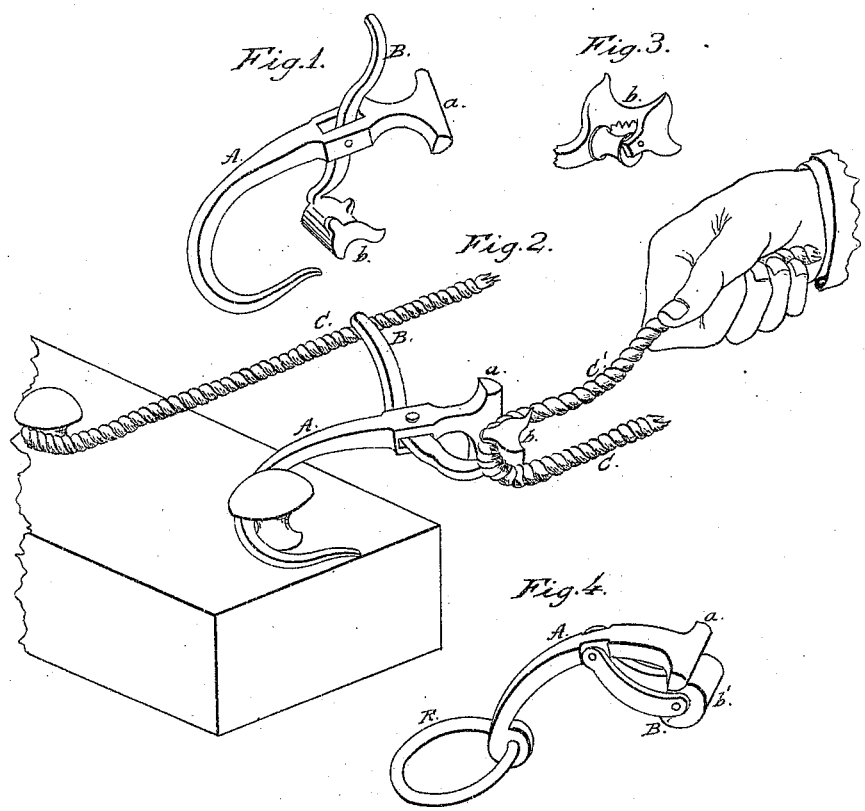

JOHN P. GRUGER AND CHARLES MAKINSON, OF LANCASTER, PENNSYLVANIA.

Letters Patent No. 77,034, dated April 21, 1868.

IMPROVED CORD-HOLDER,

*The Schedule referred to in these Letters Patent and making part of the same.*

TO ALL WHOM IT MAY CONCERN:

Be it known that we JOHN P. GRUGER and CHARLES MAKINSON, of the city of Lancaster, in the State of Pennsylvania, have invented a new and useful Improvement on Cord-Fasteners, or holders to aid in stretching the same; and we do hereby declare that the following is a full, clear, and exact description of the construction and operation of the same, reference being had to the accompanying drawings, making a part of this specification, in which—

Figure 1 gives a perspective view, as seen in one position.

Figure 2 shows the application of the cord.

Figures 3 and 4 are modes or modifications for a holder that might be adopted for various uses.

The nature of our invention consists in providing a cord-holder that is applicable for hooking over a knob, or into a loop, or the like, and readily connected or disconnected from one point to another; and is especially useful in holding a cord while it is being stretched, such, for instance, as a bed-cord.

To enable any one skilled in the art to make and use our invention, it is only necessary to inspect the drawings, which clearly show the construction of the same.

Fig. 1 shows the hook A, with a slot for the reception of the lever B. This lever B is so curved, and provided with a head, $b$, rounded and hollowed out, with side ears, to retain the cord, and so hung in its pivot in A, that, in conjunction with the rounded jaw $a$ of the hook or shaft A, they clamp the cord between them, and the stronger the pull on the clamped end, C, of the cord, the greater is the leverage and pressure made upon it. The prolonged trigger or lever-handle, B, aids in relieving the cord, in order to draw and tighten the same, pulling the end C' through between the clamps $a$ $b$, as shown, by the hand. The hook being held by the knob or otherwise, the gripe on the cord will be retained at its utmost tension, and constitutes a means for stretching bed-cords, greatly needed, and equally well adapted for a rope or tackle-holder for various other purposes.

We are aware that Patent, No. 69,996, for a line-holder, uses and claims a lever with a cross-head and crotch, arranged with a bracket-plate and socket-bearing, for pivots on the lever. This bracket is provided with screw-holes, and can only be used jointly when firmly fastened by screws; besides, the operation differs in this: the line is passed between the cross-head and the plate or bracket, and also through the crotch on the end of the lever. Our lever comes in contact with the cord only at one end, and is clamped by the jaw $a$ on the hook or shaft A, to which the lever is permanently fixed by a rivet, which acts also as a pivot to move on, and the whole is ready for application, and as readily shifted from one point to another. This differs substantially from the line-holder referred to, because that is not adapted to nor applicable for the uses of the cord-holder herein described, as our invention is not a fixture which is to be held by screws. What we deem new and useful is, the hook or its equivalent, for securing the implement temporarily, while stretching or holding the cord, the prolonged trigger to relieve the cord, and the union of the two parts A B into one, by the rivet or pivot-joint.

What we claim as our invention, and desire to secure by Letters Patent, is—

The hook A, with its jaw $a$, in combination with the lever B, with its rounded and eared head $b$, both parts, A and B, connected by a pivot-joint with each other, in the manner shown and for the purpose set forth.

JOHN P. GRUGER,
CHAS. MAKINSON.

Witnesses:
WM. B. WILEY,
JACOB STAUFFER.